US012658164B2

(12) United States Patent
Suzuki

(10) Patent No.: US 12,658,164 B2

(45) Date of Patent: Jun. 16, 2026

(54) KEYBOARD DEVICE

(71) Applicant: KAWAI MUSICAL INSTRUMENTS MANUFACTURING CO., LTD., Hamamatsu (JP)

(72) Inventor: Akihiro Suzuki, Hamamatsu (JP)

(73) Assignee: KAWAI MUSICAL INSTRUMENTS MANUFACTURING CO., LTD., Hamamatsu (JP)

( * ) Notice: Subject to any disclaimer, the term of this patent is extended or adjusted under 35 U.S.C. 154(b) by 313 days.

(21) Appl. No.: 18/443,648

(22) Filed: Feb. 16, 2024

(65) Prior Publication Data

US 2024/0290300 A1 Aug. 29, 2024

(30) Foreign Application Priority Data

Feb. 27, 2023 (JP) ................................ 2023-028594

(51) Int. Cl.

*G10C 3/12* (2006.01)

*G10H 1/34* (2006.01)

(52) U.S. Cl.

CPC ............... *G10C 3/12* (2013.01); *G10H 1/344* (2013.01)

(58) Field of Classification Search

None

See application file for complete search history.

(56) References Cited

U.S. PATENT DOCUMENTS

| | | | | |
|---|---|---|---|---|
| 4,488,472 | A | 12/1984 | Nippon et al. | |
| 2012/0000347 | A1 * | 1/2012 | Taniguchi ............. | G10H 1/346 84/423 R |

FOREIGN PATENT DOCUMENTS

| | | |
|---|---|---|
| JP | H0330874 B2 | 5/1991 |
| JP | H10116066 A | 5/1998 |

* cited by examiner

*Primary Examiner* — Kimberly R Lockett

(74) *Attorney, Agent, or Firm* — Meunier Carlin & Curfman LLC

(57) ABSTRACT

A keyboard device is provided. The keyboard device includes a keyboard in which keys are provide so as to be each pivotally movable and a keyboard chassis that supports the keyboard. Each key includes a key body, a fixing part, and a connection part that connects a rear end of the key body and the fixing part to each other. The connection part includes a hinge part, and the hinge part is provided so as to extend upward from the fixing part along same directions as those of a force to be applied to a supporting point for pivotal movement of the key at a connection between the hinge part and the fixing part when the key is pressed.

8 Claims, 13 Drawing Sheets

KEYBOARD DEVICE

CROSS-REFERENCE TO RELATED APPLICATIONS

This application claims the benefit of Japanese Patent Application No. 2023-028594 filed on Feb. 27, 2023 with the Japan Patent Office, the entire disclosure of which is incorporated herein by reference.

BACKGROUND

The present disclosure relates to a keyboard device that can be used in a keyboard instrument, such as an electronic piano.

For example, Japanese Examined Patent Publication (Kokoku) No. H03-030874 discloses, as a structure for supporting a key of a keyboard instrument in a pivotally movable manner when the key is pressed, a structure in which a thin and plate-shaped hinge part is provided so as to connect the key to a fixing part that fixes the key to a keyboard chassis. This hinge part is elastic, and enables key-pressing by moving pivotally with the connection with the fixing part functioning as a supporting point for the pivotal movement when the key is pressed.

Known as such a hinge part are, for example, a member extending so as to connect the key to the fixing part horizontally, and a member bent in a U-like shape in a vertical direction, as disclosed in Japanese Unexamined Patent Application Publication No. H10-116066.

SUMMARY

In the above-described prior art, however, since the hinge part is a thin and plate-shaped member, unnecessary deformation of the hinge part may occur in some cases, such as where the key is pressed strongly during performance (i.e., in a case of hard-hitting performance). For example, at the time of hard-hitting performance or the like, the hinge part may be deformed in an up-down direction and/or a front-rear direction at a portion other than a supporting point for pivotal movement of the key. Occurrence of such an unnecessary deformation of the hinge part may cause troubles, such as likelihood of damage to the hinge part and loss of a responsive feel at the time of hard hitting.

One aspect of the present disclosure is to provide a technique by which unnecessary deformation of a hinge part is less likely to occur when a key is pressed.

(1) One aspect of the present disclosure is a keyboard device comprising a keyboard and a keyboard chassis that supports the keyboard. The keyboard includes keys, and each key is provided so as to be pivotally movable.

In this keyboard device, each key includes a key body extending in a front-rear direction, a fixing part fixed to the keyboard chassis, and a connection part that connects a rear end of the key body and the fixing part to each other. The connection part includes a hinge part that is elastic and connected to the fixing part. The hinge part is provided so as to extend upward from the fixing part along same directions as those of a force to be applied to a supporting point for pivotal movement of the key at a connection between the hinge part and the fixing part when the key is pressed.

Such a configuration has an effect that deformation of the hinge part is less likely to occur even in a case where a large force is applied to the hinge part when the keyboard instrument is played (especially, at the time of hard-hitting performance). Specifically, since the hinge part is provided so as to extend along the same directions as those of the force to be applied to the supporting point for pivotal movement at key-pressing, unnecessary deformation of the hinge part is less likely to occur even when a large force is applied to the supporting point for pivotal movement in some cases, such as hard-hitting performance. This leads to an effect that damage to the hinge part can be inhibited, and/or an effect that loss of a responsive feel at the time of hard hitting can be inhibited.

(2) In one aspect of the present disclosure, the connection part may have a shape bent so as to protrude upward. The hinge part may be provided on a rear-end side of the connection part. Such a configuration enables an efficient use of the space on a lower inside of the connection part.

(3) In one aspect of the present disclosure, the connection part may further include a connection protrusion that protrudes upward from the rear end of the key body. The hinge part may connect a rear end of the connection protrusion and the fixing part to each other. Such a configuration has an advantage that, for example, even when a force to lift up the rear end of the connection protrusion is received at key-pressing, the hinge part is less likely to be damaged.

(4) In one aspect of the present disclosure, as the keyboard is viewed in a direction in which the keys are arranged side by side, the key body and the connection protrusion may be greater in thickness than the hinge part. In other words, the hinge part is thinner than the member to which the hinge part is connected, and thus, the hinge part is pivotally movable at key-pressing in a preferred manner.

(5) In one aspect of the present disclosure, as the keyboard is viewed in a direction in which the keys are arranged side by side, the hinge part may be provided in a manner inclined frontward relative to a vertical line at the supporting point for pivotal movement.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

1. Entire Configuration

Figure 1:
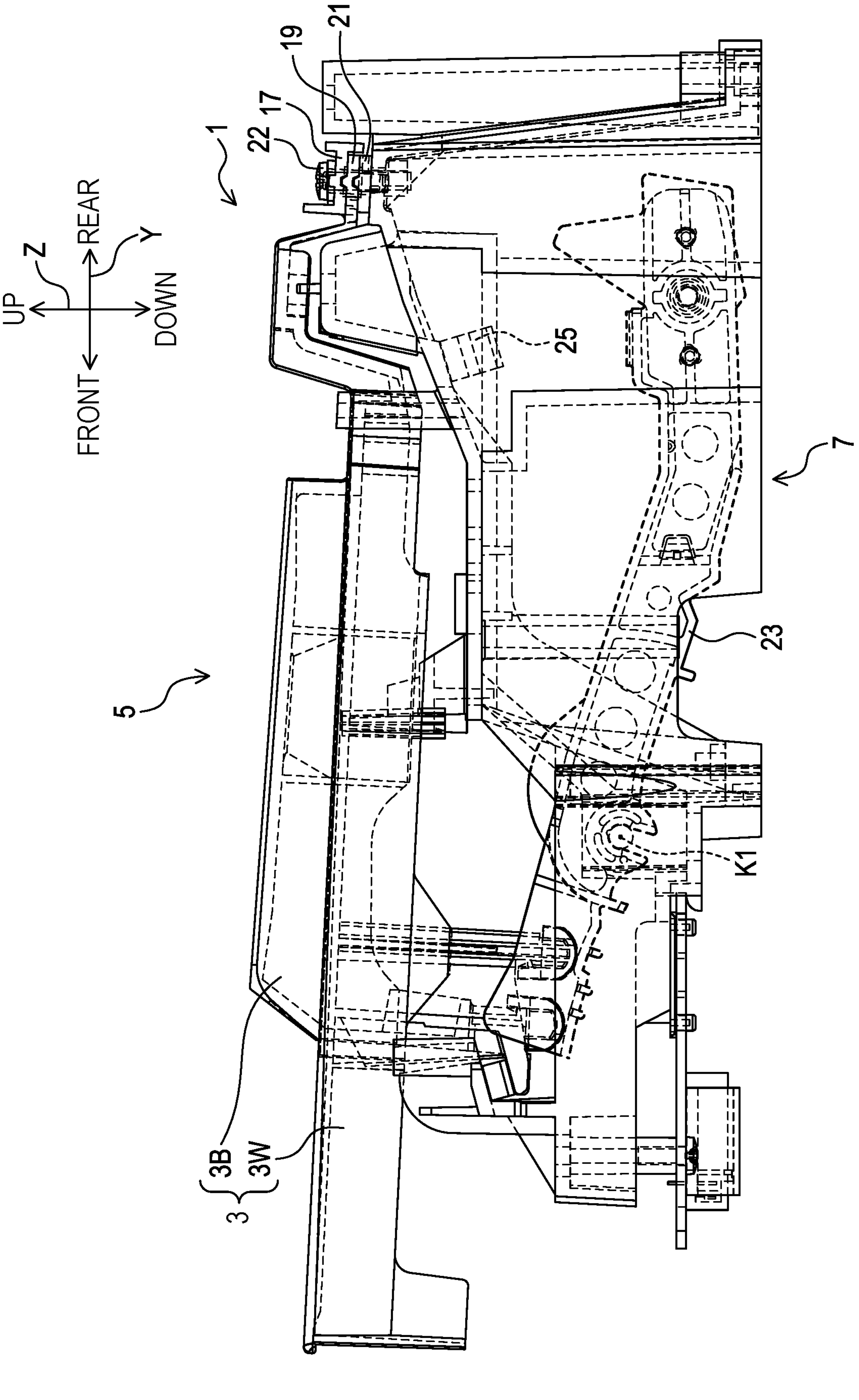
FIG. 1 is a side view of a keyboard device as viewed in a direction in which keys are arranged side by side.

As shown in FIG. 1, a keyboard device 1 of the present embodiment is used as, for example, a keyboard device for a keyboard instrument, such as an electronic piano.

The keyboard device 1 comprises a keyboard 5 and a keyboard chassis 7. The keyboard 5 comprises keys 3. The keys 3 comprise white keys 3W and black keys 3B. Each key of the white keys 3W and the black keys 3B is arranged so as to be pivotally movable. The keyboard chassis 7 supports the keyboard 5.

Hereinafter, a member related to the white key 3W is assigned with a reference numeral including a symbol W, and a member related to the black key 3B is assigned with a reference numeral including a symbol B. However, the symbols W and B are not included in some cases where no distinction is made between the white key 3W and the black key 3B.

In FIG. 1 and other drawings, a front-rear direction corresponds to a Y-axis direction of an XYZ orthogonal coordinate system, an up-down direction (i.e., a vertical direction) corresponds to a Z-axis direction of the same system, and a direction perpendicular to a Y-axis and to a Z-axis (i.e., a left-right direction in which the keys 3 are arranged side by side) corresponds to an X-axis direction of the same system. Each drawing such as FIG. 1 shows the keyboard device 1 in a state placed on a horizontal plane.

Figure 2B:
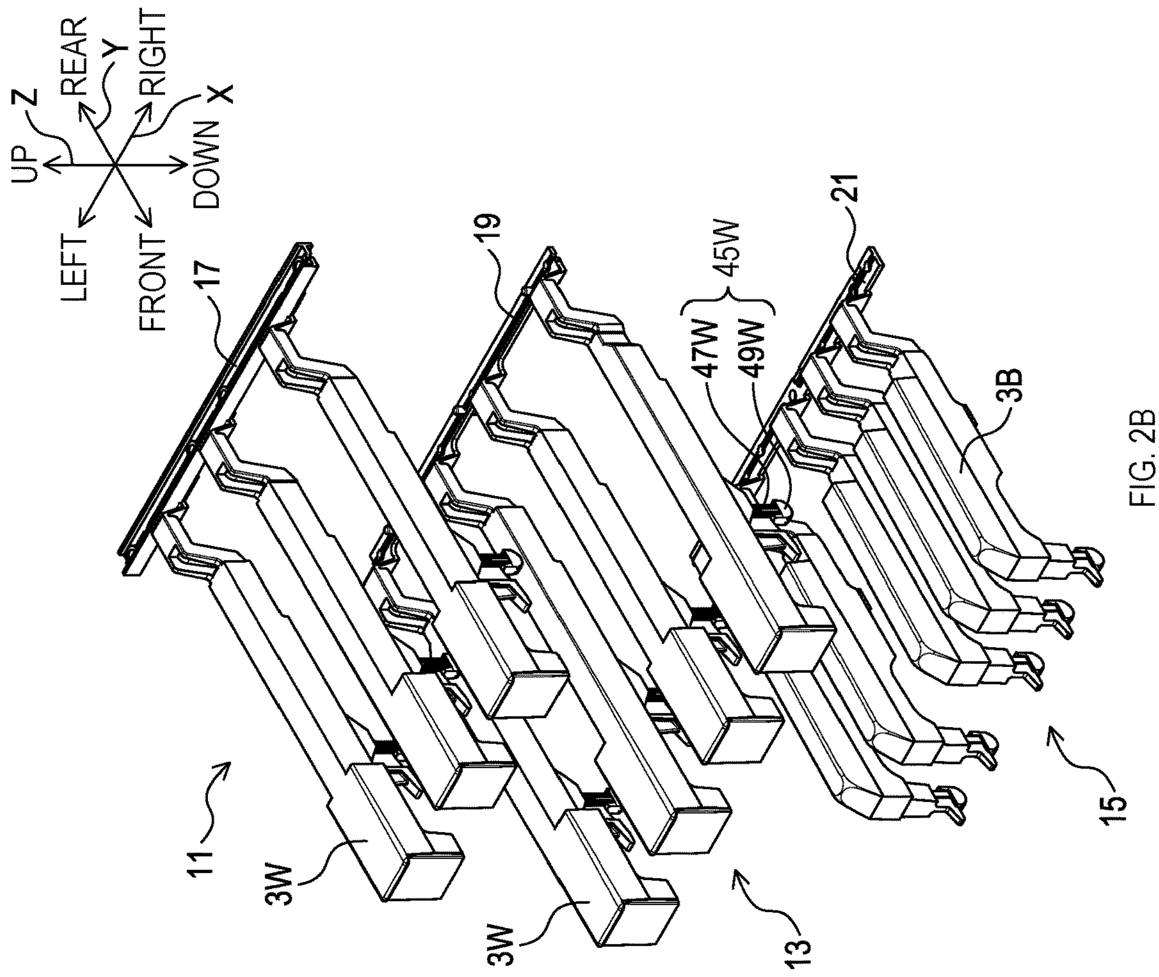
FIG. 2B is an exploded perspective view showing the keyboard in an exploded state.
Figure 2A:
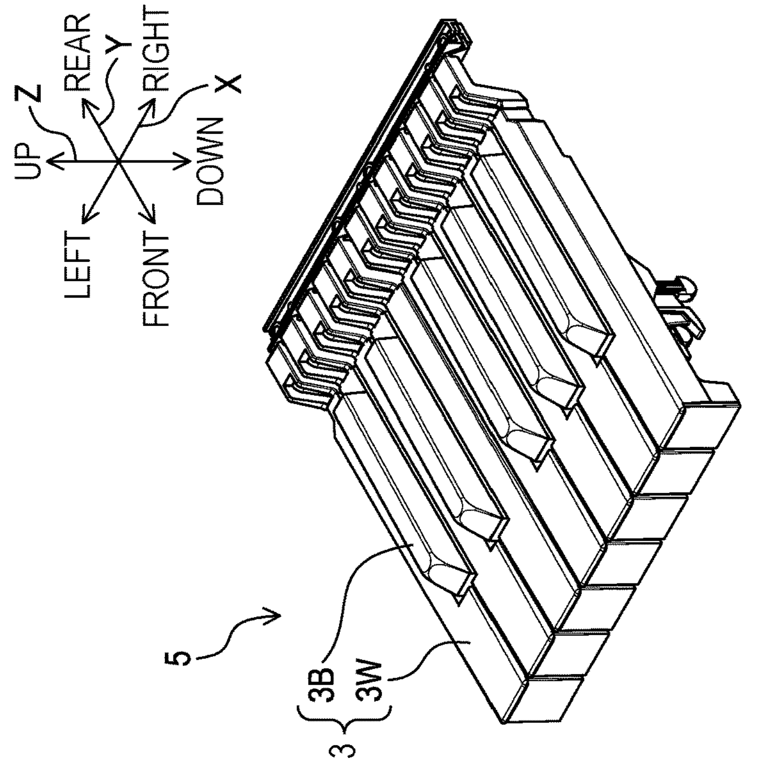
FIG. 2A is a perspective view showing a keyboard.

FIG. 2A shows a part of the keyboard 5. As shown in FIG. 2A, the keyboard 5 is configured with the keys 3 (i.e., the white keys 3W and the black keys 3B) arranged in the left-right direction.

As shown in FIG. 2B, the keyboard 5 may be configured by, for example, combining a white-key member 11 with the three white keys 3W integrated therein, another white-key member 13 with the four white keys 3W integrated therein, and a black-key member 15 with the five black keys 3B integrated therein.

The white-key members 11 and 13 and the black-key member 15 are each integrally formed of resin (e.g., ABS resin). The white-key members 11 and 13 are respectively provided with, at respective rear ends thereof, fixing parts 17 and 19 each extending in the left-right direction and having an elongated and substantially plate shape. Rear-end parts of the white keys 3W are integrally connected to the corresponding fixing parts 17 and 19. Similarly, the black-key member 15 is provided with, at a rear end thereof, a fixing part 21 extending in the left-right direction and having an elongated and substantially plate shape. Rear-end parts of the black keys 3B are integrally connected to the fixing part 21.

The fixing parts 17, 19, and 21 are stacked in the up-down direction and integrally fixed to the keyboard chassis 7 with a fixing member, such as a bolt 22 (see FIG. 1).

As shown in FIG. 1, a hammer 23 is arranged under the keyboard 5 for each key 3. The hammer 23 is configured to move pivotally about a pivot point K1 in association with a key-pressing action on the key 3. The keyboard chassis 7 is provided with a stopper 25 arranged above the hammer 23 in order to restrict a pivotal movement of the hammer 23 that goes beyond a specific level at key-pressing. The stopper 25 is formed of, for example, a material having cushioning properties (i.e., a cushioning material), such as felt.

Figure 3A:
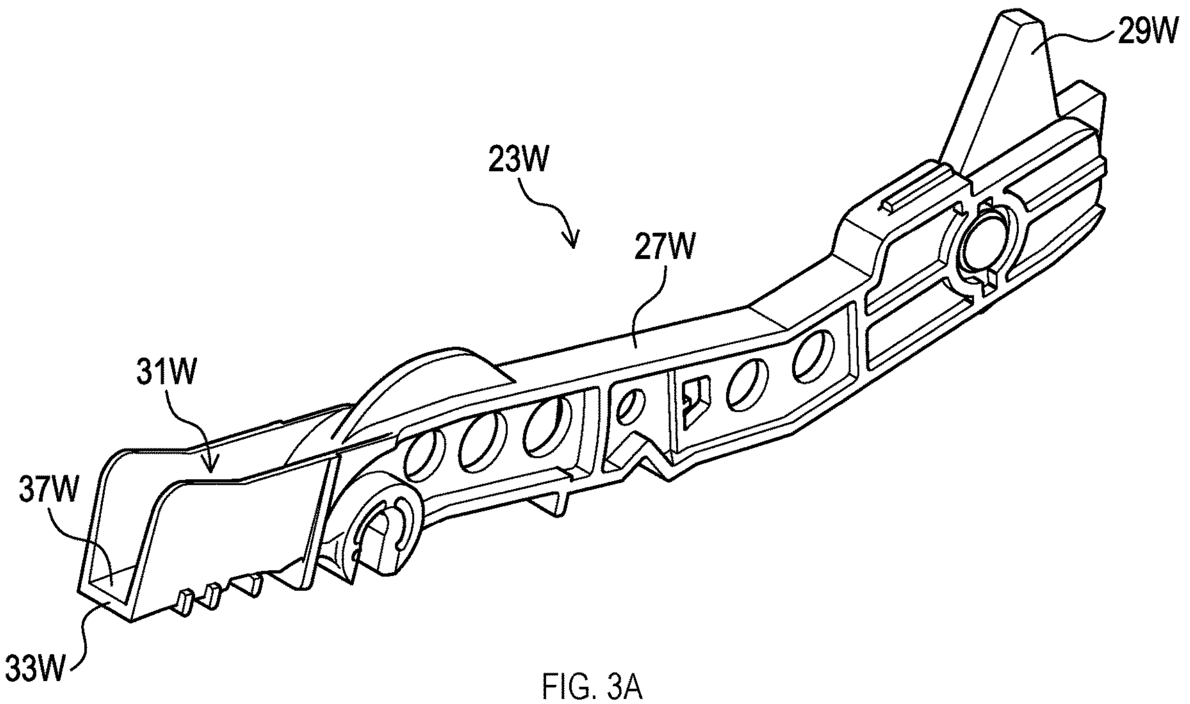
FIG. 3A is a perspective view of a hammer for a white key.
Figure 3B:
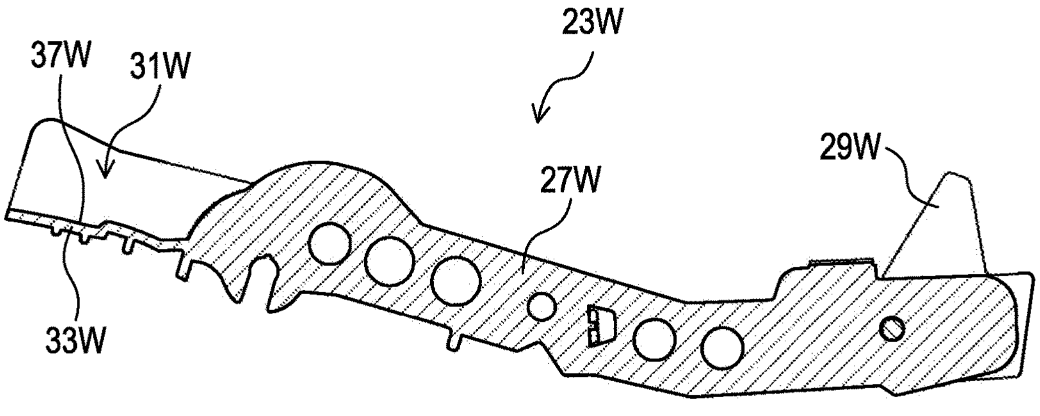
FIG. 3B is a sectional view of the hammer for the white key taken along a YZ plane.
Figure 4:
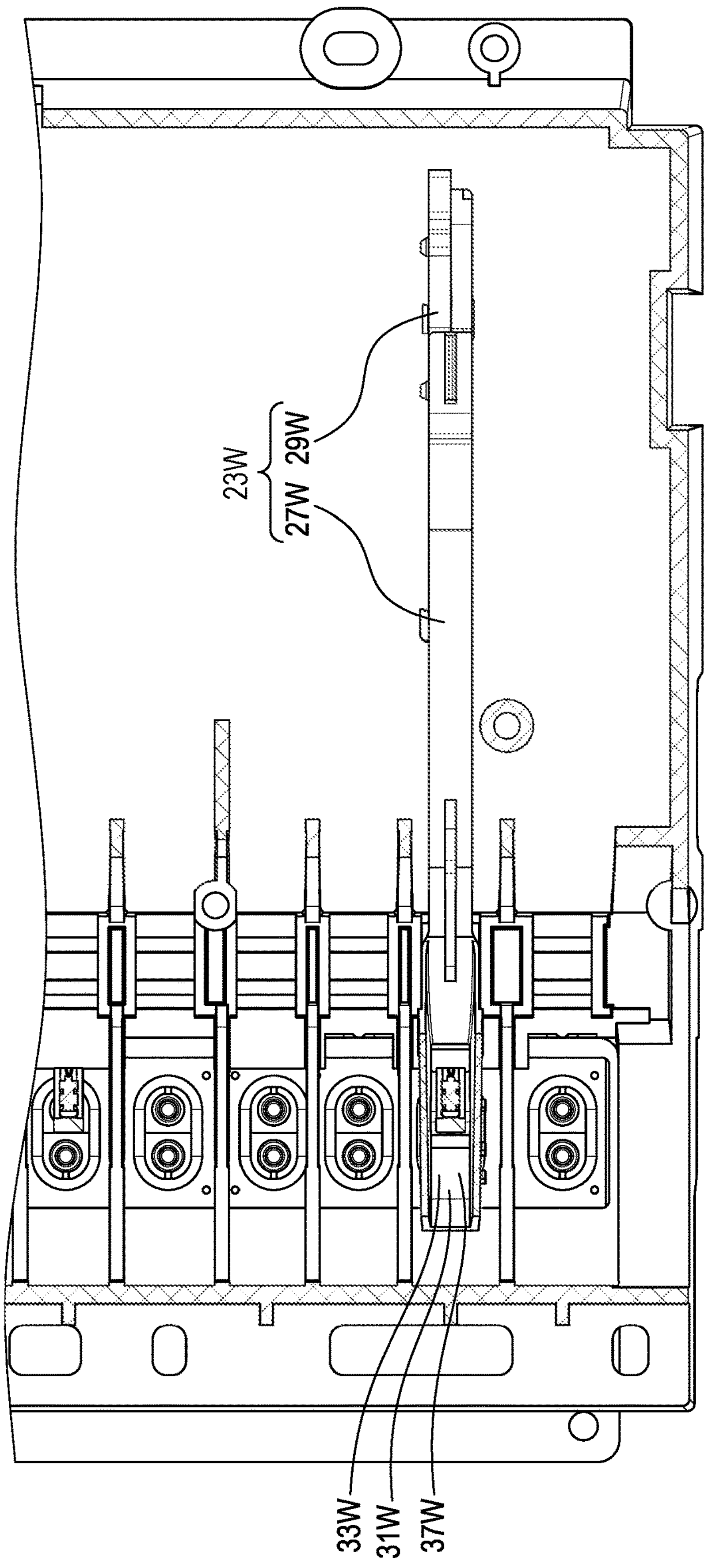
FIG. 4 is a sectional view showing a structure of the hammer for the white key, taken along a line IV-IV in FIG. 5.

For example as shown in FIGS. 3A, 3B, and 4, a hammer 23W for the white key 3W comprises a hammer body 27W that is made of resin (e.g., polyacetal) and that has an elongated shape, and a weight 29W that is made of metal (e.g., iron) and that is attached to a rear end of the hammer body 27W.

A groove part 31W opened upward and frontward is provided to the hammer 23W on its front-end side. A bottom part 33W of the groove part 31W is provided with a sliding surface 37W as will be described below. The sliding surface 37W is a surface with which an actuator 45W (see, for example, FIG. 5) of the white key 3W contacts and on which it slides. A hammer 23B for the black key 3B has almost the same configuration as will be described below.

2. Elements Related to White Key

Next, elements related to the white key 3W are explained based on FIGS. 5 to 8B. For the explanation here, the white-key member 13 is used as an example.

Figure 5:
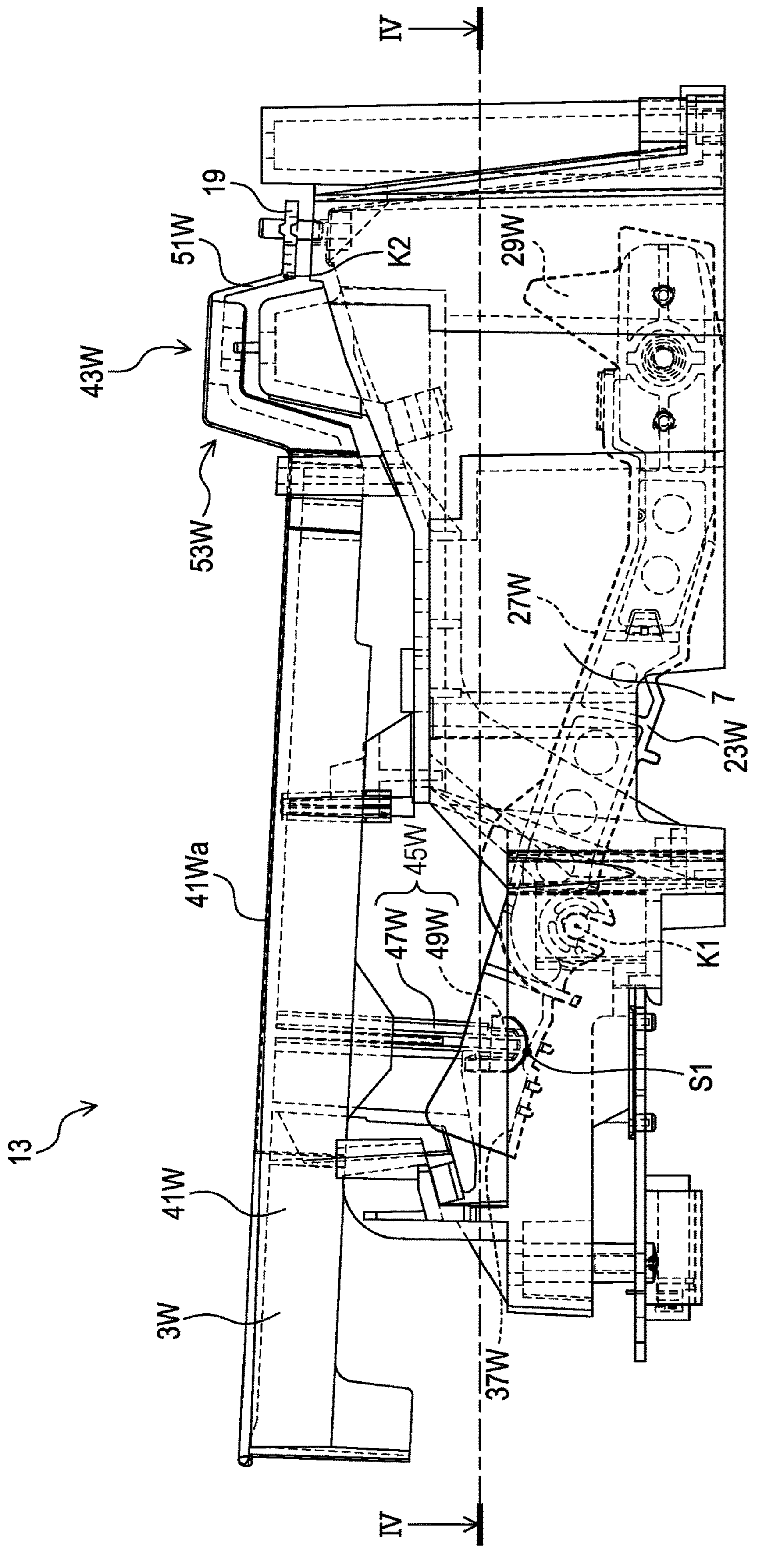
FIG. 5 is a side view showing a configuration of the keyboard device before key-pressing of the white key.

FIG. 5 shows the white key 3W before key-pressing, and thus, the weight 29W on a rear-end side of the hammer 23W is in a lowered state. On the other hand, FIG. 6 shows the white key 3W after key-pressing, and thus, the weight 29W on the rear-end side of the hammer 23W is in a raised state.

Figure 6:
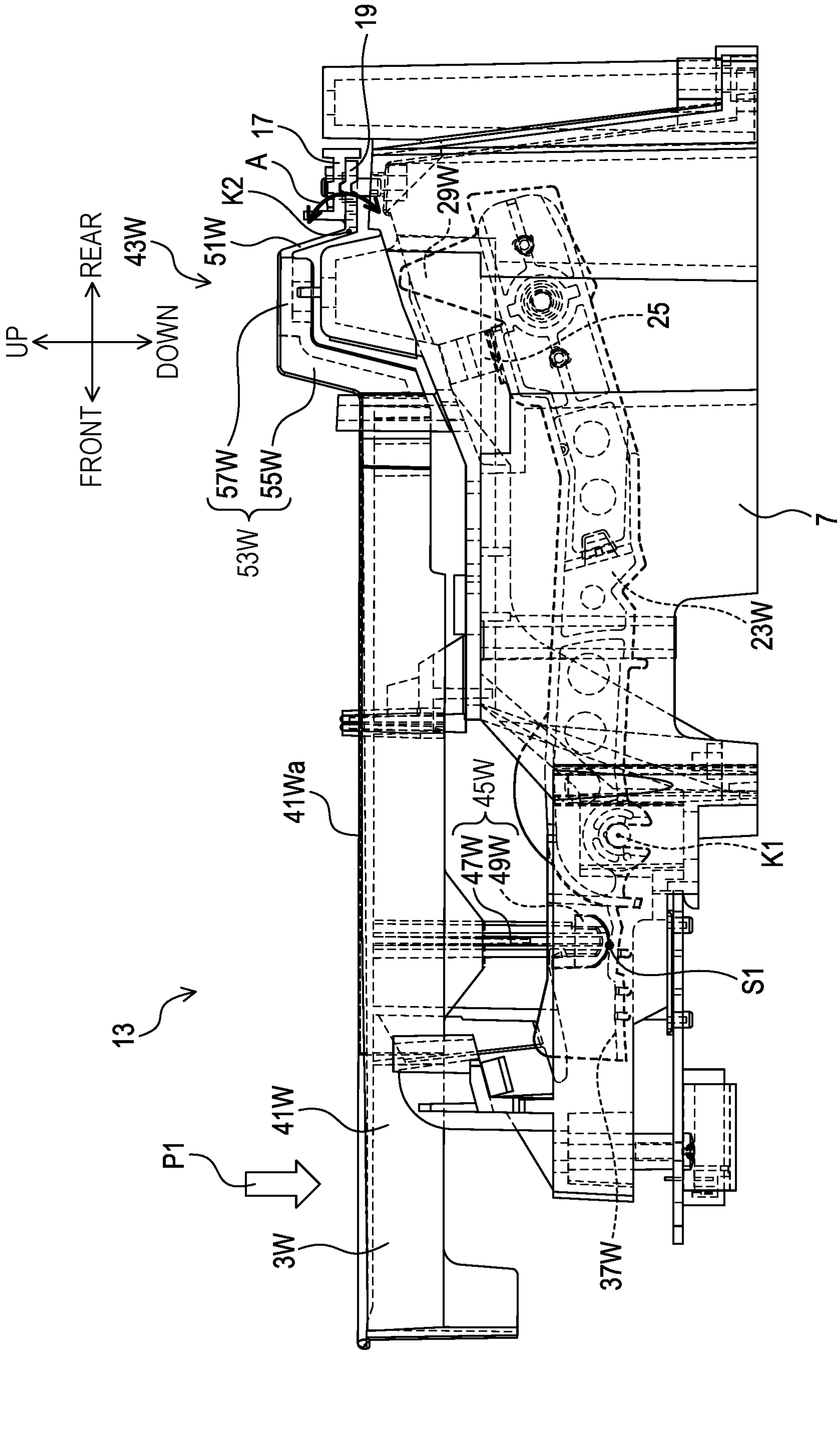
FIG. 6 is a side view showing a configuration of the keyboard device after key-pressing of the white key.

As shown in FIGS. 5 and 6, the white key 3W comprises a key body 41W extending in the front-rear direction and having an elongated shape, a fixing part 19 fixed to the keyboard chassis 7, and a connection part 43W that connects a rear end of the key body 41W and a front end of the fixing part 19 to each other. In FIGS. 5 and 6, elements related to the black key 3B are omitted.

On a bottom side of the key body 41W, the actuator 45W is provided so as to protrude downward from the key body 41W perpendicularly to the key body 41W.

The actuator 45W comprises a column body 47W that has a columnar shape and protrudes downward from the key body 41W, and a leading end part 49W that has a substantially hemispherical shape and is attached to a leading end (i.e., a lower end) of the column body 47W.

A hemispherical surface of the leading end part 49W is in contact with the sliding surface 37W of the hammer 23W before key-pressing, and has a function of pressing down a front-end part of the hammer 23W while sliding on the sliding surface 37W in association with a key-pressing action.

As shown in FIG. 6, when the front-end part of the hammer 23W is pressed down, the hammer 23W moves pivotally about the pivot point K1 (i.e., moves pivotally in a counterclockwise direction), whereby a rear-end part (i.e., the weight 29W) of the hammer 23W is raised.

As viewed in the X-axis direction (i.e., as viewed from the side), the connection part 43W has a shape bent so as to protrude upward of a plane containing an upper surface 41W*a* of the key body 41W (specifically, a shape bent to be substantially trapezoidal so as to be opened downward). The connection part 43W comprises, on a rear-end side thereof, a hinge part 51W, which is a thin and plate-shaped member with elasticity.

Specifically, as viewed in the X-axis direction, the connection part 43W comprises a connection protrusion 53W having a substantially L-shape on a rear-end side of the key body 41W, and comprises the hinge part 51W on a rear-end side of the connection protrusion 53W. The connection protrusion 53W protrudes upward of the plane containing the upper surface 41W*a* of the key body 41W, and a rear end of the connection protrusion 53W and the front end of the fixing part 19 are connected to each other by the hinge part 51W.

More specifically, as shown in FIG. 6, the connection protrusion 53W comprises a protruding part 55W extending upward (specifically, diagonally rearward) from the rear end of the key body 41W, and a parallel part 57W extending rearward from a rear end of the protruding part 55W parallel to the upper surface 41W*a* of the key body 41W (i.e., extending in the front-rear direction). Further, an upper end of the hinge part 51W is connected to a rear end of the parallel part 57W. The hinge part 51W extends downward (specifically, diagonally rearward) from the rear end of the parallel part 57W.

The hinge part 51W is a flat-plate-shaped member that is pivotally movable at key-pressing during performance. Specifically, the hinge part 51W is pivotally movable so as to be bent about a key supporting point K2, which is a connection with the fixing part 19, at key-pressing (i.e., at keystroke). The hinge part 51W is rectangular in shape as viewed in a thickness direction (i.e., substantially in the Y-axis direction), and is constant in thickness.

As the keyboard 5 is viewed in a direction in which the keys 3 are arranged side by side (i.e., in the X-axis direction), the key body 41W and the connection protrusion 53W are greater in thickness than the hinge part 51W. In other words, the hinge part 51W is smaller in thickness than the key body 41W and the connection protrusion 53W. The hinge part 51W is smaller in thickness than the fixing part 19.

Accordingly, at key-pressing in which the white key 3W is pressed at, for example, a position indicated by an arrow P1, the hinge part 51W is pivotally movable about the connection with the fixing part 19 (i.e., about the key supporting point K2) along directions A (specifically, in the counterclockwise direction in FIG. 6).

Figure 7:
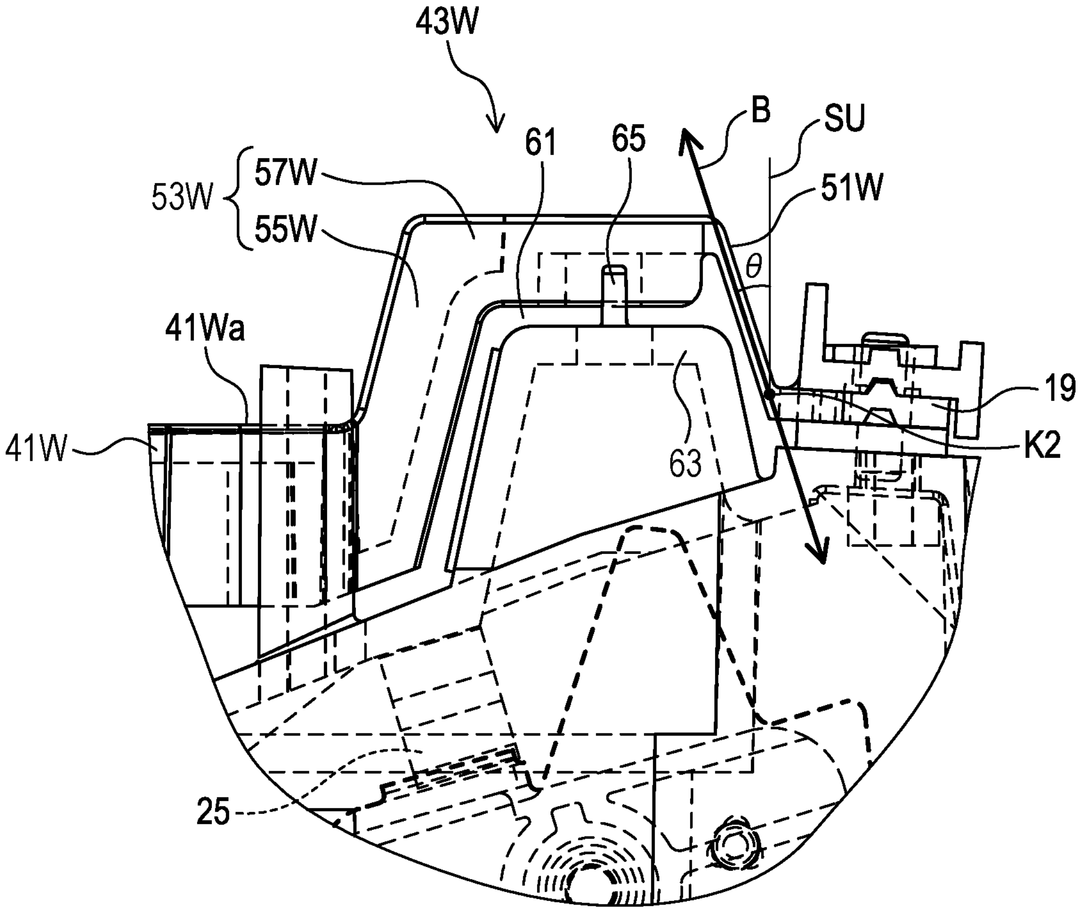
FIG. 7 is a side view showing a connection part of the white key and therearound in an enlarged manner.

Especially in the present embodiment, as shown in FIG. 7 depicting a part of FIG. 6 in an enlarged manner, the hinge part 51W is provided so as to extend upward (specifically, slightly diagonally forward) from the front end of the fixing part 19, in other words, so as to extend upward of the plane containing the upper surface 41W*a* of the key body 41W.

Moreover, the hinge part 51W is provided so as to extend along the same directions (i.e., directions B) as those of a force to be applied at key-pressing to the connection between the hinge part 51W and the fixing part 19 (i.e., to the key supporting point K2).

Specifically, as viewed in the X-axis direction, the hinge part 51W is inclined forward by a specific angle (i.e., an inclination angle θ) relative to a perpendicular line (i.e., vertical line) SU extending in the Z-axis direction at the key supporting point K2. More specifically, the hinge part 51W is arranged on a plane inclined such that an upper end of the hinge part 51W is positioned forward of a lower end of the hinge part 51W. Here, the inclination angle θ may be, for example, an angle between a line connecting the lower end of the hinge part 51W (i.e., the key supporting point K2) to the upper end of the hinge part 51W and the perpendicular line SU. A value of the inclination angle θ after key-pressing (i.e., at stoppage by hitting the stopper 25) is larger than a value of the inclination angle θ before the key-pressing.

The inclination angle θ may be set to a range of, for example, 16° to 19° before and after key-pressing. When the inclination angle θ is within this range, it is possible, at key-pressing, to match the directions in which the hinge part 51W extends to directions of a force to be applied to the hinge part 51W, at the key supporting point K2.

Accordingly, in the present embodiment, the inclination angle θ (e.g., the inclination angle θ before key-pressing) of the hinge part 51W is set such that, at key-pressing, specifically at a certain point of time in a period from the start of key-pressing till the end of key-pressing (e.g., at a point of time of the start of key-pressing or at a point of time of the end of key-pressing), the directions of the force to be applied to the hinge part 51W and the directions in which the hinge part 51W extends match each other, at the key supporting point K2. The inclination angle θ before key-pressing shall correspond to the inclination angle θ at the start of key-pressing.

Configuration of Connection Part and Therearound

Here, a characteristic configuration of the connection part 43W and therearound is described.

As shown in FIG. 7, the connection part 43W has a structure bent so as to protrude upward as described above. Specifically, the connection part 43W has a configuration in which the protruding part 55W extends diagonally downward and frontward from a front end of the parallel part 57W and in which the hinge part 51W extends diagonally downward and rearward from the rear end of the parallel part 57W, which configuration is like a trapezoid with a pair of left and right legs more spaced apart from each other toward a lower side.

Accordingly, on a lower inside of the connection part 43W, a space 61 having a substantially trapezoidal shape as viewed in the X-axis direction is arranged along the X-axis direction.

In the space 61, an inner support 63 having a substantially trapezoidal plate shape as viewed in the X-axis direction is arranged, along a lower inner surface of the connection part 43W, so as to extend in the X-axis direction. Provided on an upper surface of the inner support 63 are upper restrictors 65 that protrude upward so as to each reach the corresponding parallel part 57W. Each upper restrictor 65 comes into contact with the corresponding parallel part 57W when a force is applied in the left-right direction (i.e., the X-axis direction) at key-pressing to restrict movement of the parallel part 57W in the left-right direction, thereby inhibiting damage to the corresponding hinge part 51W.

Action of White Key

Figure 8A:
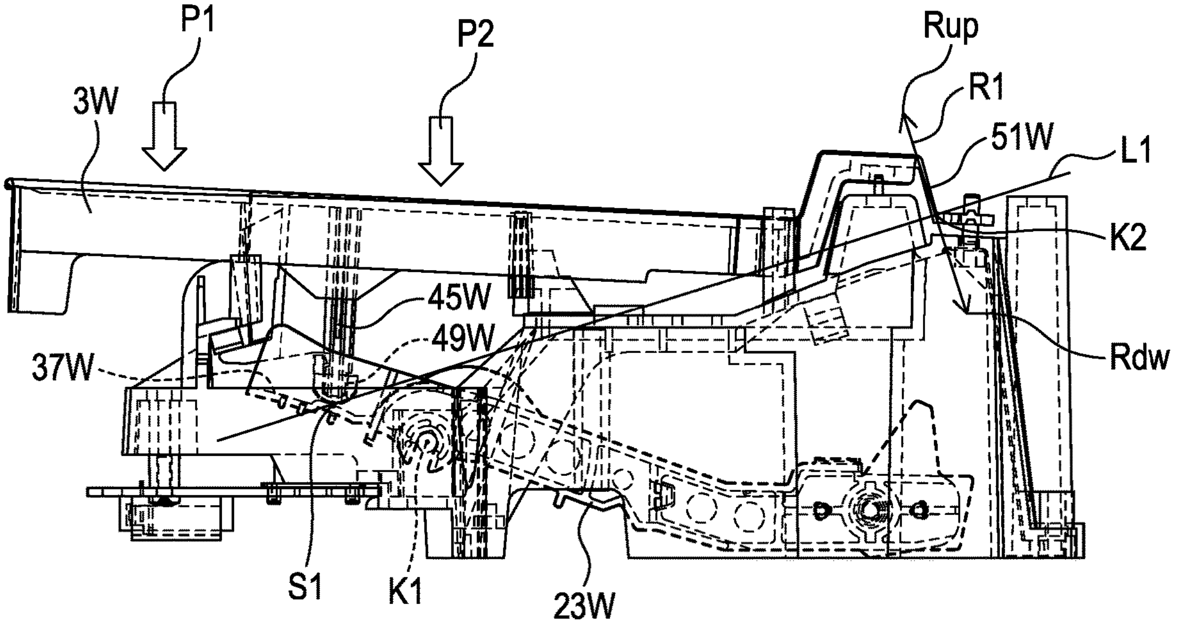
FIG. 8A is an explanatory diagram showing directions of a force to be applied to a hinge part when key-pressing of the white key is started.
Figure 8B:
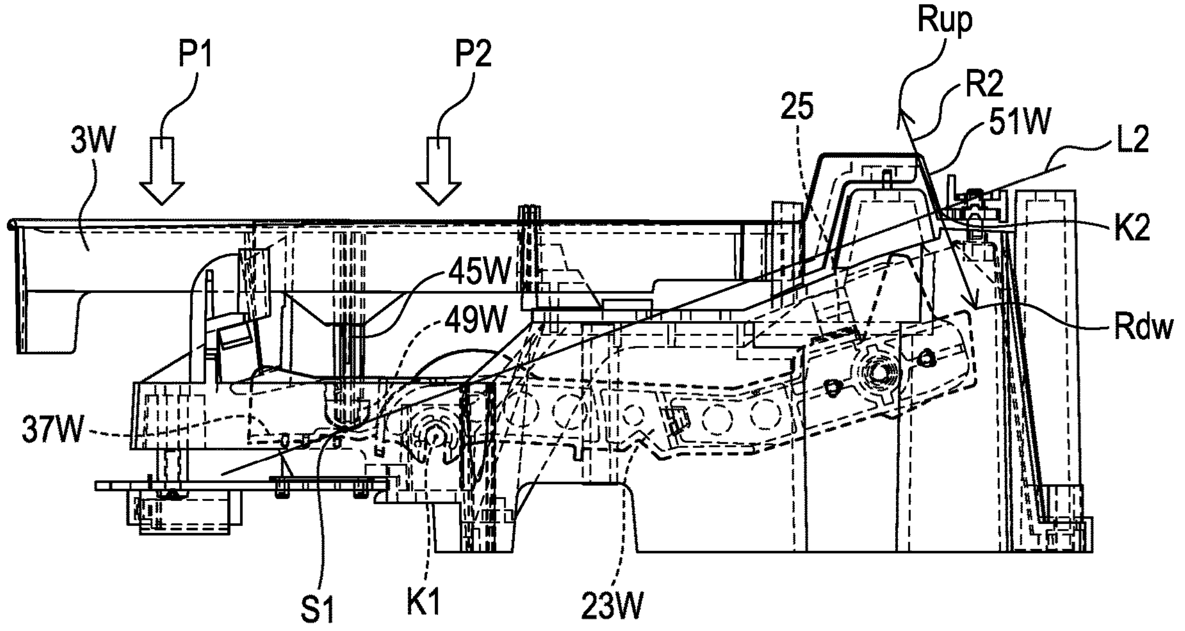
FIG. 8B is an explanatory diagram showing directions of a force to be applied to the hinge part after key-pressing of the white key.

Next, action of the white key 3W is described based on FIGS. 8A and 8B.

As shown in FIG. 8A, in a state before key-pressing of the white key 3W, the leading end part 49W of the actuator 45W is in contact with the sliding surface 37W of the hammer 23W.

In this state, for example when a front-side part of the white key 3W is pressed at a position indicated by the arrow P1 (i.e., when key-pressing is started), a force pressing the white key 3W presses the sliding surface 37W of the hammer 23W via the actuator 45W. The position indicated by the arrow P1 corresponds to a position forward of a position where the actuator 45W is provided.

Here, the directions of the force to be applied to the hinge part 51W are directions R1 perpendicular to a straight line L1 connecting a contact point S1 between the leading end part 49W of the actuator 45W and the sliding surface 37W to the key supporting point K2, as viewed in the X-axis direction.

When the white key 3W is pressed at the position indicated by the arrow P1 as described above, an upward force along the directions R1 (i.e., a force in an Rup direction) is applied at the key supporting point K2 with the contact point S1 of the leading end part 49W of the actuator 45W functioning as a supporting point.

When the white key 3W is pressed at a position indicated by an arrow P2 that is rearward of the actuator 45W, a downward force along the directions R1 (i.e., a force in an Rdw direction) is applied at the key supporting point K2 with the contact point S1 of the leading end part 49W of the actuator 45W functioning as a supporting point.

Then, as shown in FIG. 8B, when the white key 3W is pressed to its lower limit, the sliding surface 37W of the hammer 23W is pressed down to its lower limit by the actuator 45W. In this case, the rear-end part of the hammer 23W is raised to hit the stopper 25, and a further raise is restricted.

Here, the directions of the force to be applied to the hinge part 51W are directions R2 perpendicular to a straight line L2 connecting the contact point S1 between the leading end part 49W of the actuator 45W and the sliding surface 37W to the key supporting point K2, as viewed in the X-axis direction.

When the white key 3W is pressed at the position indicated by the arrow P1 as described above, an upward force along the directions R2 (i.e., a force in an Rup direction) is applied at the key supporting point K2 with the contact point S1 of the leading end part 49W of the actuator 45W functioning as a supporting point.

When the white key 3W is pressed at the position indicated by the arrow P2 that is rearward of the actuator 45W, a downward force along the directions R2 (i.e., a force in an Rdw direction) is applied at the key supporting point K2 with the contact point S1 of the leading end part 49W of the actuator 45W functioning as a supporting point.

The straight line L1 and the straight line L2 are slightly different in inclination from each other, and a value of the inclination of the straight line L2 relative to a horizontal line (the Y-axis) is larger than that of the straight line L1.

3. Elements Related to Black Key

Next, the elements related to the black key 3B are explained based on FIGS. 9 to 13B. For the elements similar to those related to the white key 3W, explanation is omitted or simplified.

Figure 9:
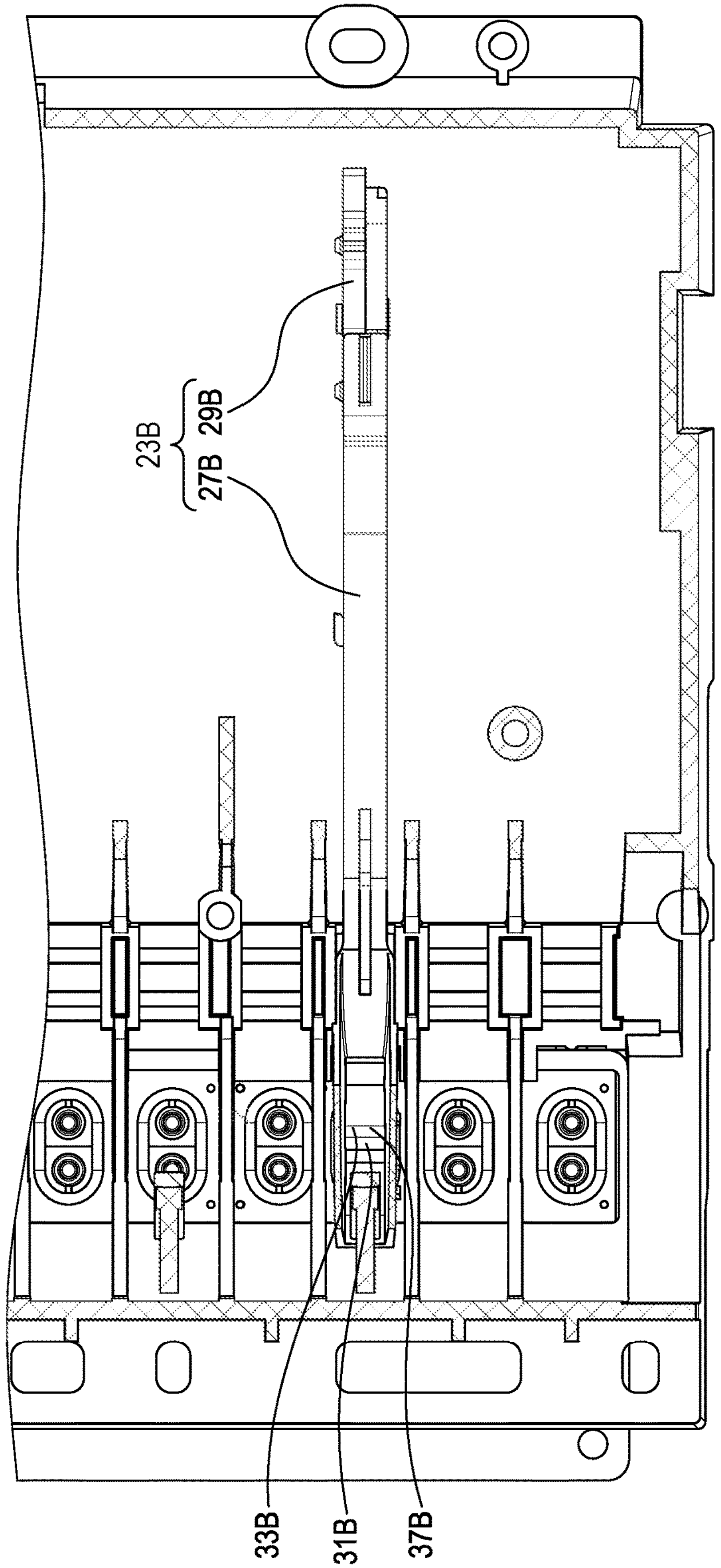
FIG. 9 is a sectional view showing a structure of a hammer for a black key, taken along a line IX-IX in FIG. 10.
Figure 10:
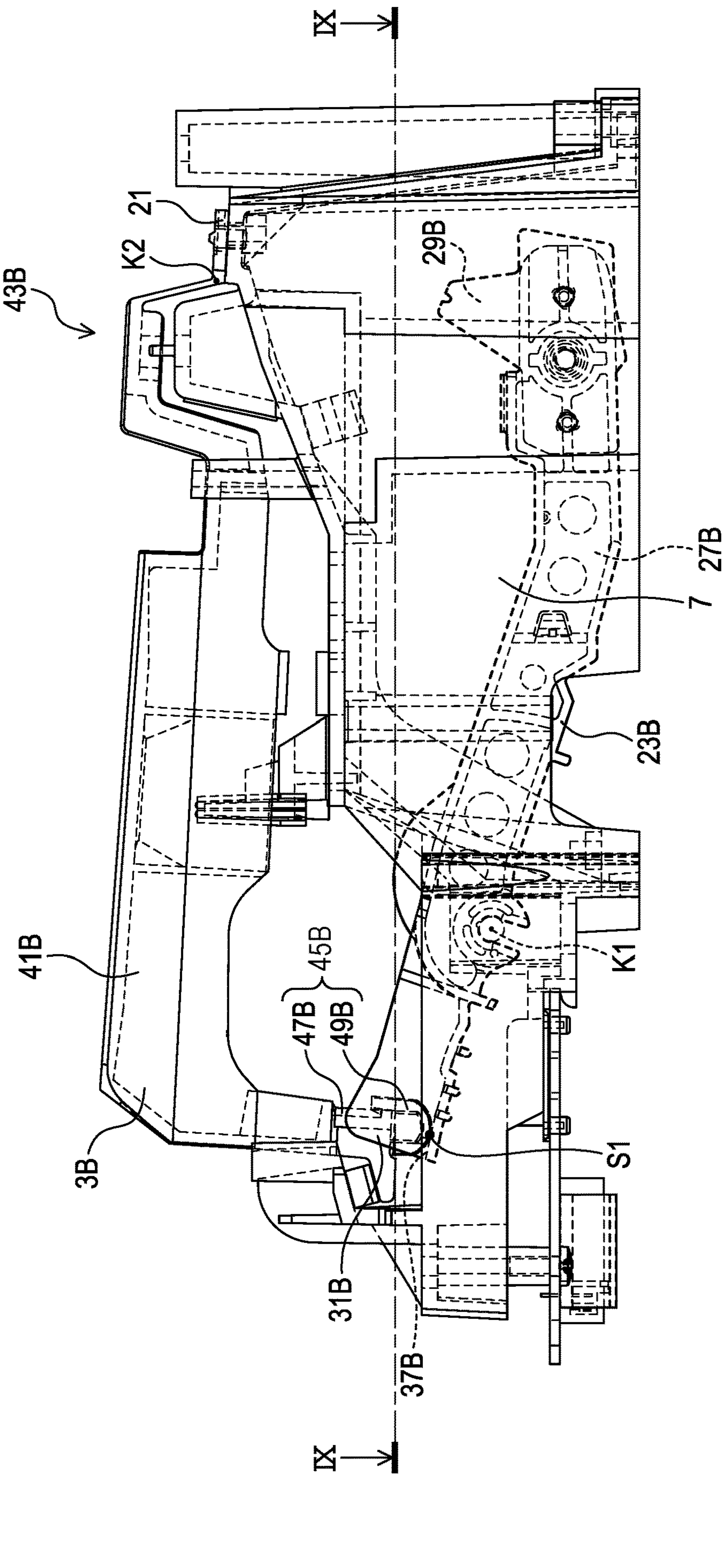
FIG. 10 is a side view showing a configuration of the keyboard device before key-pressing of the black key.

For each black key 3B, the corresponding hammer 23B is arranged. As shown in FIGS. 9 and 10, each hammer 23B comprises a hammer body 27B and a weight 29B in a similar manner as in the hammer 23W of the white key 3W.

The hammer body 27B basically has a shape substantially similar to that of the hammer body 27W, and comprises, on a front-end side of the hammer body 27B, a groove part 31B, a bottom part 33B, and a sliding surface 37B each having the same shape as that of, respectively, the groove part 31W, the bottom part 33W, and the sliding surface 37W of the hammer body 27W. The sliding surface 37B is a sliding surface on which a leading end part 49B of an actuator 45B slides.

Figure 11:
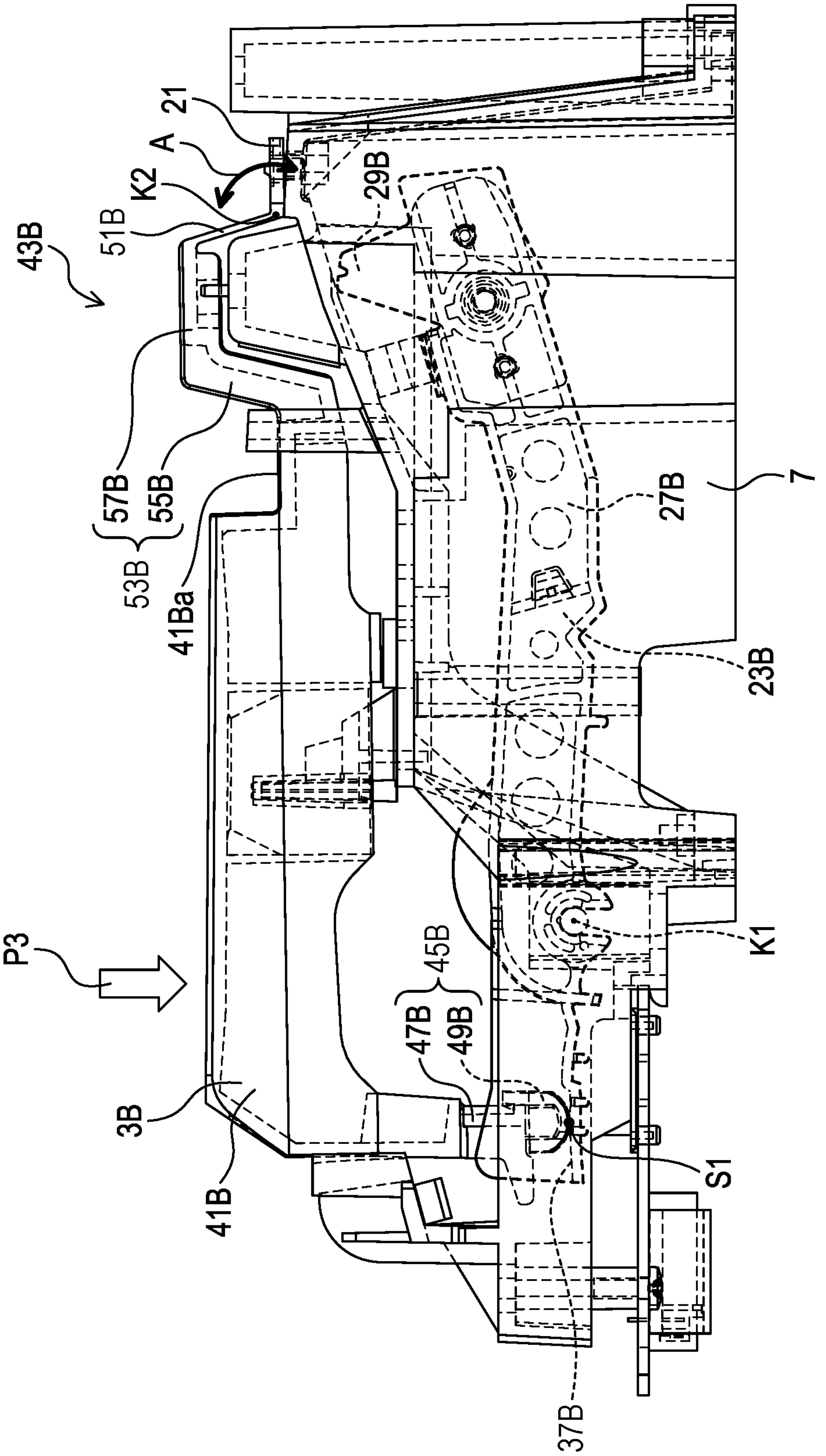
FIG. 11 is a side view showing a configuration of the keyboard device after key-pressing of the black key.

As shown in FIGS. 10 and 11, a shape of the weight 29B is slightly different from that of the weight 29W, and the height of the weight 29B at its upper end is set to be smaller than that of the weight 29W at its upper end.

The black key 3B comprises a key body 41B extending in the front-rear direction, the fixing part 21 fixed to the keyboard chassis 7, and a connection part 43B that connects a rear end of the key body 41B and a front end of the fixing part 21 to each other. In FIGS. 10 and 11, the elements related to the white key 3W are omitted.

On a bottom side of the front-end part of the key body 41B, the actuator 45B is provided so as to protrude downward from the key body 41B perpendicularly to the key body 41B.

The actuator 45B comprises a column body 47B that has a columnar shape and protrudes from the key body 41B, and the leading end part 49B that has a substantially hemispherical shape and is attached to a leading end (i.e., a lower end) of the column body 47B.

The leading end part 49B is in contact with the sliding surface 37B of the hammer 23B before key-pressing, and has a function of pressing down a front-end part of the hammer 23B while sliding on the sliding surface 37B in association with a key-pressing action. As shown in FIG. 11, when the front-end part of the hammer 23B is pressed down, the hammer 23B moves pivotally about the pivot point K1, whereby a rear-end part (i.e., the weight 29B) of the hammer 23B is raised.

As shown in FIG. 11, the connection part 43B has a shape bent so as to protrude upward (i.e., a shape bent to protrude into a substantially trapezoidal shape opened downward) as in the white key 3W. The shape of the connection part 43B as viewed in the X-axis direction is similar to that of the connection part 43W of the white key 3W. That is, the connection part 43B protrudes upward of an upper surface 41B*a* adjacent to the connection part 43B as viewed in the X-axis direction.

The connection part 43B comprises, on a rear-end side thereof, a hinge part 51B, which is a thin and plate-shaped member with elasticity. The hinge part 51B is a rectangular flat-plate-shaped member that is pivotally movable about the key supporting point K2 at key-pressing during performance, as in the white key 3W. The thickness of the hinge part 51B is constant.

Specifically, as viewed in the X-axis direction, the connection part 43B comprises a connection protrusion 53B having a substantially L-shape extending to protrude upward from the rear end of the key body 41B, and the hinge part 51B connects a rear end of the connection protrusion 53B and a front end of the fixing part 21 to each other.

More specifically, the connection protrusion 53B comprises a protruding part 55B extending upward (specifically, diagonally rearward) from the rear end of the key body 41B, and a parallel part 57B extending rearward from a rear end of the protruding part 55B parallel in the front-rear direction. Further, an upper end of the hinge part 51B is connected to a rear end of the parallel part 57B, and the hinge part 51B extends downward (specifically, diagonally rearward) from the rear end of the parallel part 57B.

As the keyboard 5 is viewed in the X-axis direction, the key body 41B and the connection protrusion 53B are greater in thickness than the hinge part 51B. In other words, the hinge part 51B is smaller in thickness than the key body 41B and the connection protrusion 53B. The thickness of the hinge part 51B is smaller than that of the fixing part 21.

Accordingly, when the black key 3B is pressed at, for example, a position indicated by an arrow P3, the hinge part 51B is pivotally movable about the connection with the fixing part 21 (i.e., about the key supporting point K2) along the directions A (specifically, in the counterclockwise direction in FIG. 11).

Figure 12:
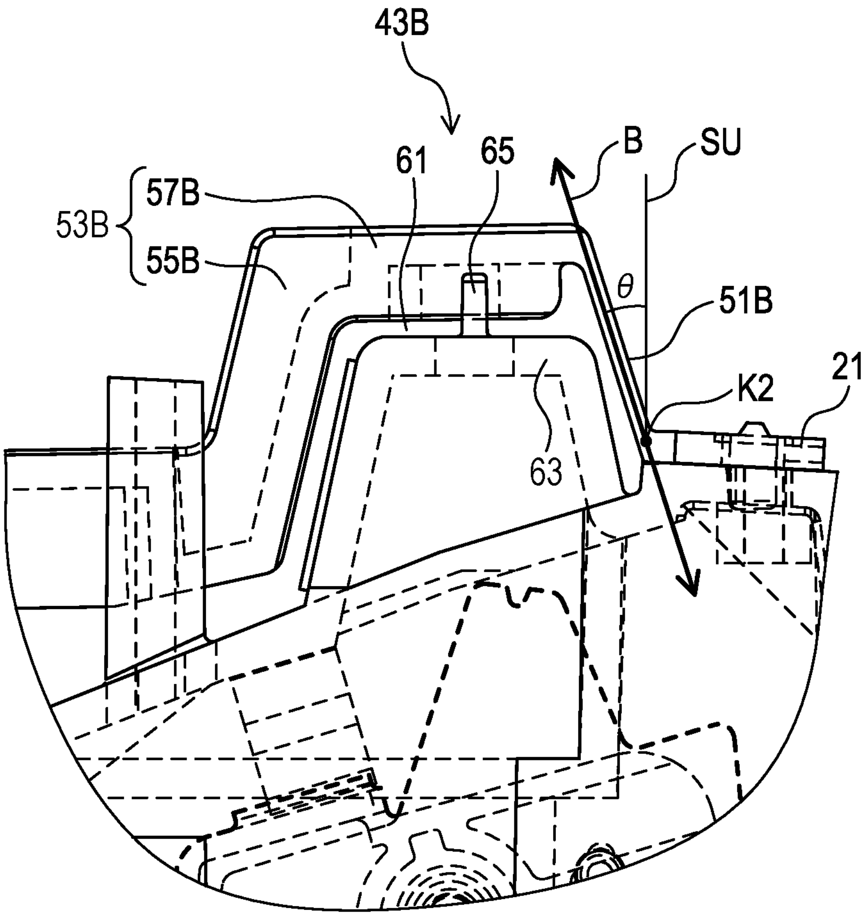
FIG. 12 is a side view showing a connection part of the black key and therearound in an enlarged manner.

Especially in the present embodiment, as shown in FIG. 12 depicting a part of FIG. 11 in an enlarged manner, the hinge part 51B is provided so as to extend upward from the fixing part 21, and is provided along the same directions (i.e., the directions B) as those of a force to be applied to the key supporting point K2, which is the connection between the hinge part 51B and the fixing part 21, at key-pressing.

As viewed in the X-axis direction, the hinge part 51B is provided to be inclined forward by a specific angle (i.e., an inclination angle θ) relative to the perpendicular line SU extending in the Z-axis direction at the key supporting point K2, as in the white key 3W. The inclination angle θ may be the same as that in the white key 3W or may be within a range that can be adopted in the white key 3W.

Configuration of Connection Part and Therearound

Here, an explanation is given of a characteristic configuration of the connection part 43B and therearound, which is basically similar to that of the connection part 43W and therearound of the white key 3W.

The connection part 43B has a structure bent so as to protrude upward as described above (i.e., in a manner similar to that of the connection part 43W of the white key 3W). That is, the connection part 43B has a shape like a trapezoid with a pair of left and right legs more spaced apart from each other toward a lower side.

Accordingly, on a lower inside of the connection part 43B, the space 61 having a substantially trapezoidal shape is arranged as viewed in the X-axis direction.

In the space 61, the inner support 63 having a substantially trapezoidal shape extending in the X-axis direction is arranged along a lower inner surface of the connection part 43B. Provided on the upper surface of the inner support 63 are the upper restrictors 65 that protrude upward so as to each reach the corresponding parallel part 57B.

Action of Black Key

Figure 13A:
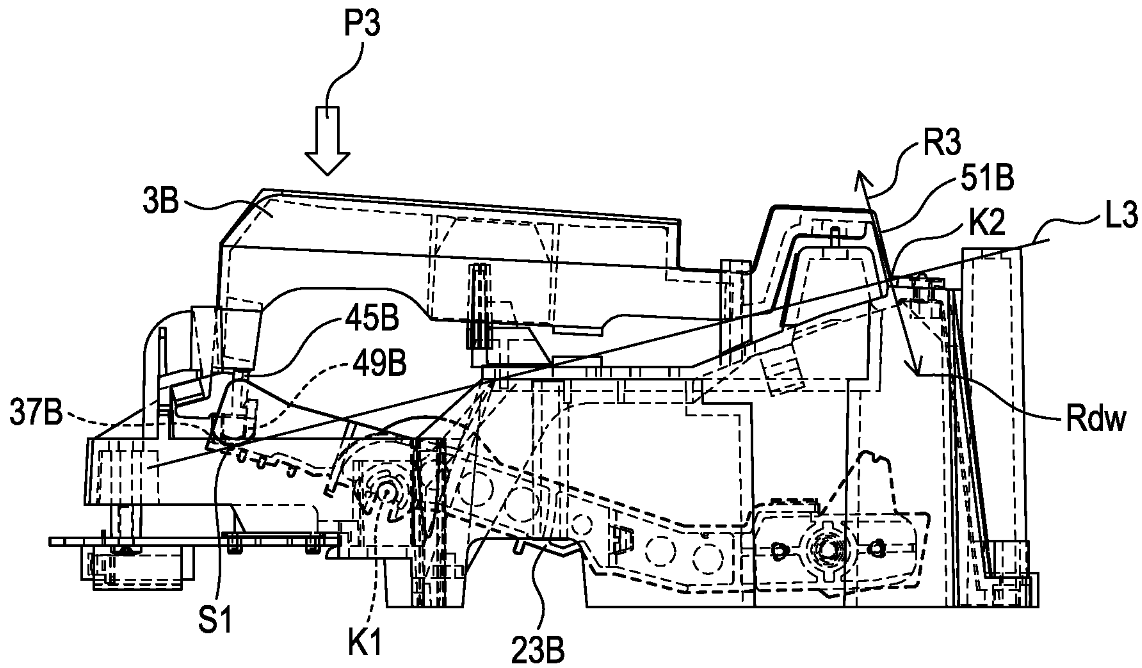
FIG. 13A is an explanatory diagram showing directions of a force to be applied to a hinge part when key-pressing of the black key is started.
Figure 13B:
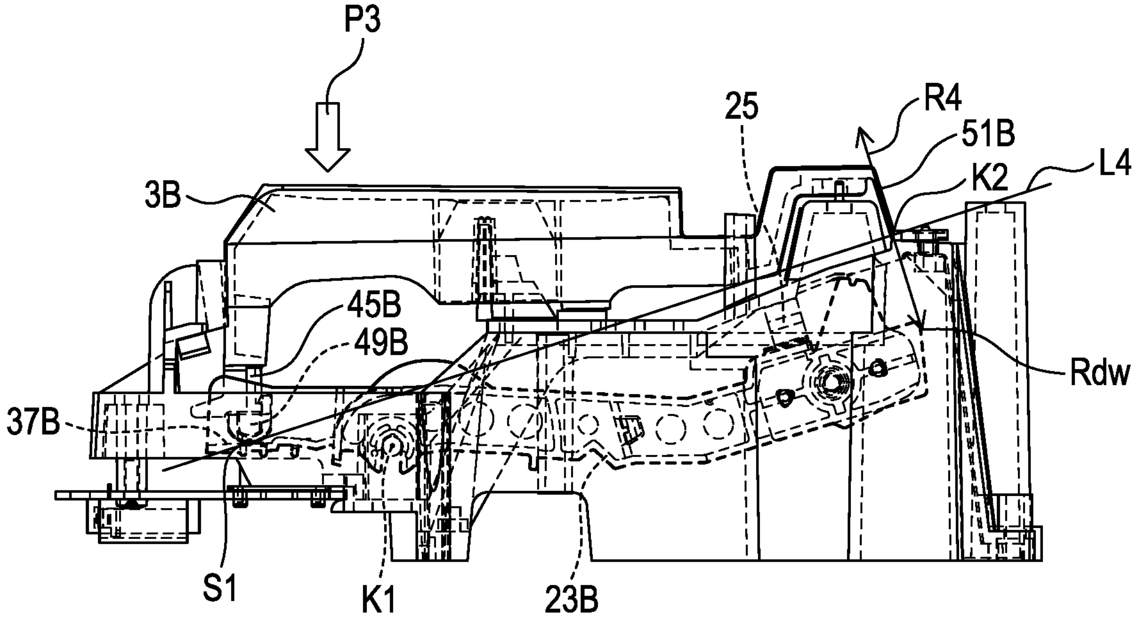
FIG. 13B is an explanatory diagram showing directions of a force to be applied to the hinge part after key-pressing of the black key.

Next, action of the black key 3B is described based on FIGS. 13A and 13B.

As shown in FIG. 13A, in a state before key-pressing of the black key 3B, the leading end part 49B of the actuator 45B is in contact with the sliding surface 37B of the hammer 23B.

In this state, for example when the black key 3B is pressed at the position indicated by the arrow P3 (i.e., when key-pressing is started), a force pressing the black key 3B presses the sliding surface 37B of the hammer 23B via the actuator 45B.

Here, directions of a force to be applied to the hinge part 51B are directions R3 perpendicular to a straight line L3 connecting a contact point S1 between the leading end part 49B of the actuator 45B and the sliding surface 37B to the key supporting point K2, as viewed in the X-axis direction.

When the black key 3B is pressed at the position indicated by the arrow P3 as described above, a downward force along the directions R3 (i.e., a force in an Rdw direction) is applied at the key supporting point K2.

Then, as shown in FIG. 13B, when the black key 3B is pressed to its lower limit, the sliding surface 37B of the hammer 23B is pressed down to its lower limit by the actuator 45B. Thus, the rear-end part of the hammer 23B is raised to hit the stopper 25, and a further raise is restricted.

Here, the directions of the force to be applied to the hinge part 51B are directions R4 perpendicular to a straight line L4 connecting the contact point S1 between the leading end part 49B of the actuator 45B and the sliding surface 37B to the key supporting point K2, as viewed in the X-axis direction.

When the black key 3B is pressed at the position indicated by the arrow P3 as described above, a downward force along the directions R4 (i.e., a force in an Rdw direction) is applied at the key supporting point K2.

The straight line L3 and the straight line L4 are slightly different in inclination from each other, and a value of the inclination of the straight line L4 relative to the horizontal line (the Y-axis) is larger than that of the straight line L3.

4. Effects

The embodiment detailed above produces effects described below. The symbols W and B are omitted below.

(4a) In the keyboard device 1 of the present embodiment, each key 3 comprises the key body 41 extending in the front-rear direction, a corresponding one of the fixing parts 17, 19, and 21 fixed to the keyboard chassis 7, and the connection part 43 that connects the rear end of the key body 41 and the corresponding one of the fixing parts 17, 19, and 21 to each other. Further, the connection part 43 comprises the hinge part 51 that is elastic and connected to the corresponding one of the fixing parts 17, 19, and 21. The hinge part 51 is provided so as to extend upward from the corresponding one of the fixing parts 17, 19, and 21 along the same directions as those of the force to be applied to the key supporting point K2 at the connection between the hinge part 51 and the corresponding one of the fixing parts 17, 19, and 21 at key-pressing.

Such a configuration has an effect that deformation of the hinge part 51 is less likely to occur even in a case where a large force is applied to the hinge part 51 when the keyboard instrument is played (especially, at the time of hard-hitting performance). Specifically, since the hinge part 51 is provided so as to extend along the same directions as those of the force to be applied to the key supporting point K2 at key-pressing, unnecessary deformation of the hinge part 51 is less likely to occur even when a large force is applied to the key supporting point K2 in some cases, such as hard-hitting performance. This leads to an effect that damage to the hinge part 51 can be inhibited, and/or an effect that loss of a responsive feel at the time of hard hitting can be inhibited.

(4b) In the present embodiment, the connection part 43 has the shape bent so as to protrude upward, and comprises the hinge part 51 on the rear-end side of the connection part 43. Such a configuration enables an efficient use of the space 61 on the lower inside of the connection part 43.

(4c) In the present embodiment, the connection part 43 further comprises the connection protrusion 53 that protrudes upward from the rear end of the key body 41, and the hinge part 51 connects the rear end of the connection protrusion 53 and the corresponding one of the fixing parts 17, 19, and 21 to each other. Such a configuration has an advantage that, for example, even when a force to lift up the rear end of the connection protrusion 53 is received at key-pressing, the hinge part 51 is less likely to be damaged as it extends along the directions in which the force is applied.

(4d) In the present embodiment, as the keyboard 5 is viewed in the direction in which the keys 3 are arranged side by side, the key body 41 and the connection protrusion 53 are greater in thickness than the hinge part 51. In other words, the hinge part 51 is thinner than the member to which the hinge part 51 is connected, and thus, the hinge part 51 is pivotally movable at key-pressing in a preferred manner.

Other Embodiments

Although the embodiment of the present disclosure has been described so far, the present disclosure may take various forms without being limited to the above-described embodiment.

(5a) For example, the shape of the connection part (as viewed in the X-axis direction) is not limited to the substantially trapezoidal shape, and may be various shapes, such as a shape curved so as to protrude upward.

(5b) In the above-described embodiment, the connection part comprises the connection protrusion having a substantially L-shape, and the hinge part is provided on the rear-end side of the connection protrusion as an example; however, the connection part is not limited to such a configuration. For example, the connection protrusion does not need to have a substantially L-shape as it is sufficient that the connection protrusion protrudes upward.

(5c) As the connection part, other than the configuration in which a part of the connection part on the rear-end side is the hinge part as in the above-described embodiment, a configuration in which the connection part is entirely formed by the hinge part may be employed. For example, in a case of employing a configuration in which the position of the fixing part is lowered relative to the key body, the hinge part may be directly connected to the rear end of the key body (in other words, the entirety of the connection part may be the hinge part). In this case, since the position of the key body is higher, a configuration may be employed in which the hinge part extends diagonally downward from the rear end of the key body (i.e., toward the fixing part in the diagonally lower position).

(5d) A function of a single element in the above-described embodiments may be performed by two or more elements in a distributed manner, and a function of two or more elements may be performed by a single element in an integrated manner. A part of the configuration in the above-described embodiments may be omitted. At least a part of the configuration in the above-described embodiments may be added to or replace a configuration in other embodiments.

What is claimed is:

1. A keyboard device comprising:
a keyboard in which keys are provided so as to be each pivotally movable; and
a keyboard chassis that supports the keyboard,
each key including:
a key body extending in a front-rear direction;
a fixing part fixed to the keyboard chassis; and
a connection part that connects a rear end of the key body and the fixing part to each other,
the connection part including a hinge part that is elastic and connected to the fixing part, and
the hinge part being provided so as to extend upward from the fixing part along same directions as those of a force to be applied to a supporting point for pivotal movement of the key at a connection between the hinge part and the fixing part when the key is pressed.

2. The keyboard device according to claim 1,
wherein the connection part has a shape bent so as to protrude upward, and
wherein the hinge part is provided on a rear-end side of the connection part.

3. The keyboard device according to claim 2,
wherein the connection part further includes a connection protrusion that protrudes upward from the rear end of the key body, and
wherein the hinge part connects a rear end of the connection protrusion and the fixing part to each other.

4. The keyboard device according to claim 3,
wherein, as the keyboard is viewed in a direction in which the keys are arranged side by side, the key body and the connection protrusion are greater in thickness than the hinge part.

5. The keyboard device according to claim 1,
wherein, as the keyboard is viewed in a direction in which the keys are arranged side by side, the hinge part is provided in a manner inclined frontward relative to a vertical line at the supporting point for pivotal movement.

6. The keyboard device according to claim 2,
wherein, as the keyboard is viewed in a direction in which the keys are arranged side by side, the hinge part is provided in a manner inclined frontward relative to a vertical line at the supporting point for pivotal movement.

7. The keyboard device according to claim 3,
wherein, as the keyboard is viewed in a direction in which the keys are arranged side by side, the hinge part is provided in a manner inclined front ward relative to a vertical line at the supporting point for pivotal movement.

8. The keyboard device according to claim 4,
wherein, as the keyboard is viewed in a direction in which the keys are arranged side by side, the hinge part is provided in a manner inclined frontward relative to a vertical line at the supporting point for pivotal movement.

* * * * *